United States Patent [19]

Ward et al.

[11] Patent Number: 4,992,512

[45] Date of Patent: Feb. 12, 1991

[54] POLYMER ALLOYS

[75] Inventors: Brian J. Ward, Easton; David A. Williams, Gansevoort; Paul R. Willey, Clifton Park, all of N.Y.

[73] Assignee: General Electric Company, Waterford, N.Y.

[21] Appl. No.: 412,246

[22] Filed: Sep. 20, 1989

[51] Int. Cl.$^5$ .............................................. C08L 83/00
[52] U.S. Cl. ................................... 525/100; 525/476; 525/477; 525/478; 525/479; 525/104; 525/105; 525/106; 525/187; 525/193
[58] Field of Search ............... 525/476, 477, 478, 479, 525/100, 104, 105, 106, 187, 193

[56] References Cited

U.S. PATENT DOCUMENTS

| | | | |
|---|---|---|---|
| 4,150,010 | 4/1979 | Itoh et al. | 260/37 |
| 4,201,698 | 5/1980 | Itoh et al. | 266/3 |
| 4,365,042 | 12/1982 | Cooper et al. | 525/68 |
| 4,526,922 | 7/1985 | Pickwell et al. | 525/105 |
| 4,555,546 | 11/1985 | Patel | 525/194 |
| 4,600,741 | 7/1986 | Aycock et al. | 525/397 |
| 4,650,849 | 3/1987 | Nishimura et al. | 528/26 |
| 4,659,851 | 4/1987 | Plueddemann | 556/431 |
| 4,713,415 | 12/1987 | Lavenwood et al. | 525/183 |

OTHER PUBLICATIONS

A New High Performance Elastomer Composition by J. M. Mitchell & T. Wada, Paper No. 23, Presented by the 127th Meeting of the Rubber Division American Chemical Society Los Angeles, CA, Apr. 23–26, 1985.

*Primary Examiner*—Melvyn I. Marquis
*Assistant Examiner*—Karen A. Hellender

[57] ABSTRACT

There is provided a polymer alloy composition comprising:
A. a silicone or organic polymer reactive with an unsaturated radical;
B. a silicone or organic polymer that is not reactive with an unsaturated radical; and
C. a compatibilizer having at least one functional group that is reactive with component (B) yet not reactive with component (A) and also having at least one unsaturated functional group.

7 Claims, No Drawings

POLYMER ALLOYS

BACKGROUND OF THE INVENTION

Different polymer materials exhibit varied and different physical characteristics. It is often the case that a polymer has excellent physical properties in one area but has poor physical properties in other areas. As an example of this consider silicone rubber. While silicone rubber has excellent heat resistance, it also has poor oil and abrasion resistance in comparison to some organic polymers.

It would seem then that a simple solution would be to mechanically blend different polymers together, each having complementary physical property profiles, so that the resultant polymer blend would exhibit the superior physical properties of each component in the blend. However, the reality of the situation is that such polymer blends usually exhibit inferior physical properties.

One reason for this is the fact that polymers may have different curing mechanisms. That is, whether the polymer crosslinks by hydrosilation, condensation, etc., will determine the rate at which the polymer will react to final cure. If two or more dissimilar polymers are present and each of them cures independently of the others the result will be regions where the polymer blend is rich in one polymer and deficient in the other polymer(s).

On the other hand, if the cure mechanism is the same for two or more polymers the polymers will intercrosslink at the same rate with each other during final cure. The result is an interpenetrating polymer network that is homogeneous in each reactant.

Therefore, it is theorized that if polymers with different curing mechanisms can be compatiblilized by modification of the curing reaction in one of the polymers it will be possible to covalently bond two or more dissimilar polymer materials to take advantage of the superior physical properties of each polymer. Such a compatibilizer, then, will adapt one polymer material to chemically combine with another.

In addition, compatibility is also determined by the nature of the polymers themselves. That is, when organic and silicone polymers are blended together phase separation may occur between the organic and silicone materials. Therefore, it is also theorized that dissimilar polymer components in a composition should be compatibilized by covalently bonding to one of them a material which avoids this phase separation.

U.S. Pat. No. 4,650,849 (Nishimuar et al.) discloses a photosensitive curable resin composition comprising an organosilicon compound having amino and vinyl functional groups; a tetracarboxylic acid anhydride, and a diamino compound.

U.S. Pat. No. 4,659,851 (Plueddemann) discloses organosilicon compounds that will cohesively bond polyorganosiloxane elastomers and resins to inorganic and organic substrates. The organosilicon compounds comprise alkoxy, hydroxy, and vinyl functional siloxanes and silanes.

U.S. Pat. No. 4,365,042 (Cooper et al.) discloses compatibilized compositions containing polyphenylene oxide and EPDM-silicone rubber using fumed silica filler as the compatibilizer.

U.S. Pat. No. 4,201,698 (Itoh et al.) discloses the use of an organopolysiloxane having aliphatically unsaturated functional groups and mercapto functional groups to react with a natural rubber or a synthetic rubber.

U.S. Pat. No. 4,150,010 (Itoh et al.) discloses the use of an organopolysiloxane having mercapto functional groups to react with an ethylene-propylene copolymeric elastomer.

The compatibilization of EPDM rubber with an elastomeric organopolysiloxane by the use of silica filler is described by Mitchell and Wada, *A New Performance Elastomer Composition*, American Chemical Society, 127th Meeting of the Rubber Division, Los Angeles, CA, April 23-26, 1985.

It is an object of this invention to produce a polymer alloy composition comprising two or more polymers having different curing mechanisms and further comprising a compatibilizer to adapt the curing mechanism of one or more of the polymers so that the composition will cure the same way.

It is further an object of this invention to provide a process for producing polymer alloys.

Other objects will become apparent upon reading this specification.

SUMMARY OF THE INVENTION

According to the objects of this invention there is provided a composition comprising:

A. a silicone or organic polymer reactive with an unsaturated radical;

B. a silicone or organic polymer that is not reactive with an unsaturated radical; and C. a compatibilizer having at least one functional group that is reactive with component (B) yet not reactive with component (A) and also having at least one unsaturated functional group.

Also according to the object of this invention there is provided the cured products of the foregoing composition.

DETAILED DESCRIPTION OF THE INVENTION

The silicone or organic polymers contemplated as comprising component (A) are any natural, or synthetic, organic polymers or silicone polymers which have functional groups which will react with an unsaturated radical group. Typically, functional groups which are reactive with unsaturated radicals include vinyl, hydride, and epoxy radicals. Examples of organic polymers containing such radicals are natural rubber (e.g. sold by Hardmann Co. under the tradename "DPR"), EPDM (e.g. sold by DuPont under the tradename "NORDEL"), nitrile rubber (e.g. sold by B. F. Goodrich Co. under the tradename "HYCAR"), chloroprene (e.g. sold by DuPont under the tradename "NEOPRENE"), SBR (e.g. sold by Goodyear Tire and Rubber Co. under the tradename "PLIOFLEX"), butadiene rubber (e.g. sold by American Synpol under the tradename "E-PR"), isoprene (e.g. sold by Goodyear under the tradename "NATSYN"), butyl rubber (e.g. sold by Exxon under the tradename "BUTYL"), and, in general, epoxy functional acrylates. Examples of silicone polymers are silicone heat cured rubber, silicone LIM (Registered Trade Mark) rubber, and fluorosilicone rubbers. Such materials are well known in the art.

Preferably, component (A) is a vinyl or hydrogen containing organopolysiloxane which is comprised of monofunctional, difunctional, trifunctional, and tetrafunctional siloxane units, i.e. M, D, T, and Q units, respectively. The M units are organosiloxane units of the formula wherein $R^1R^2R^3SiO_{1/2}$ wherein $R^1$, $R^2$, and $R^3$ are each independently selected from the group consisting of hydrogen, $C_{1-12}$ alkyl, $C_{2-12}$ alkenyl, $C_{1-12}$ epoxy, and $C_{1-12}$ aryl groups.

The D units are organosiloxane units of the formula $R^1R^2SiO$ wherein $R^1$ and $R^2$ are as described above. The T units are organosiloxane units of the formula $R^1SiO_{3/2}$ wherein $R^1$ is as described above. And the Q units are of the formula $SiO_{4/2}$.

It is preferable that component (A) be a linear diorganopolysiloxane comprised essentially of D units and end capped with M units. Such polymers are classified as silicone fluids and gums, depending on polymer viscosity and molecular weight and include mixtures of high and low viscosity polysiloxanes. The diorganopolysiloxane may be represented by the following formula:

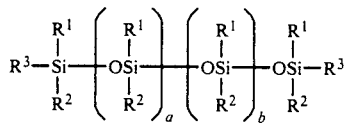

wherein $R^1$, $R^2$, and $R^3$ are as previously defined; "a" varies from 100 to 10,000; and "b" varies from 0 to 300. Such a polymer is taught by Modic in U.S. Pat. No. 3,436,366; Bobear in 3,660,345; and Jeram et al. in U.S. Pat. No. 3,884,866; hereby incorporated by reference. The most preferable embodiment is a polymer comprised essentially of D units, wherein $R^1$ and $R^2$ are methyl or phenyl, preferably methyl, and end capped with M units wherein $R^1$ and $R^2$ are methyl and $R^3$ is hydrogen, $C_{1-12}$ epoxy, or $C_{2-12}$ alkenyl, preferably $C_{2-12}$ alkenyl.

Alternatively, though not as preferable, component (A) may be an organopolysiloxane resin comprised of M and Q and, optionally, D units, with the ratio of M:Q being from about 0.5:1 to about 1:1. Such resins are taught by Modic in U.S. Pat. No. 3,436,366, hereby incorporated by reference.

In order for the composition to effectively crosslink, component (A) must contain sufficient functionality which will enable it to covalently bond to the unsaturated groups of component (C). As stated above, these functional groups may take the form of hydrogen, $C_{2-12}$ alkenyl, and $C_{1-12}$ epoxy. There should be from about 2.5 to about 10 mole percent of these radicals present in the polymer of component (A). Further, it is preferred that these functional groups be $C_{2-12}$ alkenyl; most preferably vinyl.

As stated previously, the purpose of component (8) is to impart some improvement to the physical properties of component (A). For instance, component (A) may have excellent heat resistance and poor oil resistance, as in the case of silicones. It may then be desirable to then crosslink an organic polymer with component (A) which would increase its oil resistance without adversely affecting its heat resistance. Alternatively, component (A) may have good abrasion resistance but poor heat resistance, as is the case with many organic rubbers. It may then be desirable to then crosslink a silicone with component (A) to increase heat resistance without decreasing abrasion resistance.

The silicone or organic polymers contemplated as comprising component (B) are any natural, or synthetic, organic polymers or silicone polymers which will not react with an ethylenically unsaturated radical group.

Typically, these polymers will react by a condensation reaction mechanism through condensable functional groups on the polymer molecule. Such condensable functional groups include hydroxy, alkoxy, carboxy, carboxyl, ester, and amide groups and halogens. Examples of organic polymers in this class include epichlorohydrin (e.g. sold by BFGoodrich Co. under the tradename "HYDRIN"), polyacrylates (e.g. sold by BFGoodrich Co. under the tradename "HYTEMP"), polymethacrylates, chlorinated PE (e.g. sold by Dow Chemical Co. under the tradename "TYRIN"), chlorosulfonated PE (e.g. sold by E. I. DuPont de Nemours under the tradename "HYPALON"), and halogenated butyl rubber (chlorobutyl, bromobutyl, etc., e.g. sold by Polysar Co. under the tradename "POLYSAR"). Examples of silicone polymers include silanols and alkoxy terminated polysiloxanes. In addition, halogenated silanes may also be useful, for the purposes of this invention, as component (B).

The function of the compatibilizer, component C, is to act as a bridge by covalently bonding components (A) and (B) which have two dissimilar crosslinking mechanisms. In order to accomplish this, the compatibilizer, a polyfunctional material, is first reacted to one of the reactants, for instance component (8). After this first reaction the compatibilized reactant is then reacted with the other reactant, component (A), in order to attain the final, cured polymer. The compatibilizer is necessary only in reaction systems having reactants that will react by different reaction mechanisms. If components (A) and (B) are reactive with each other absent the compatibilizer there is obviously no need for the compatibilizer in the composition. However, if component (A), will only react by hydrosilation or free radical addition reactions there will be no reaction with component (B) if component (B) will react by a condensation mechanism. In such a case a compatiblizer will be necessary in order to achieve good crosslinking between components (A) and (B).

In addition, when components (A) and (B) are different polymer systems, e.g. one being a silicone and the other being organic, it is noticed that a homogeneous mixture of the materials together is not easily maintained; phase separation occurs. Component (C) is also intended to avoid this problem as well. For instance if component (A) is a silicone and component (B) is an organic polymer, by using short chain silicones as component (C) and bonding them to component (B), compatibilized component (B) will then be miscible with and will not separate from component (A).

The compatibilizer is made up of short chain, polyfunctional silicone or organic molecules which are terminated at one end by an ethylenically unsaturated functional group and terminated at the other end by a condensable functional group. The compatibilizer is represented by the general formula:

$$R_c^4-X-R_d^5$$

wherein X is a tetravalent organic or silicon containing group; $R^4$ is an ethylenically unsaturated radical; $R^5$ is a condensable functional group that is reactive with component (B) yet not reactive with component (A); "c" is less than 4 and reater than or equal to 1; "d" is less than 4 and greater than or equal to 1; and c+d is equal to 4. Such a compatibilizer is taught in a copending application Ser. No. 412,247, filed Sept. 25, 1989, hereby incorporated by reference.

Preferably, the compatibilizer is an difunctional organsiloxane and may be represented by the formula:

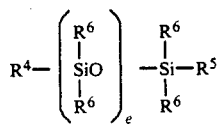

wherein $R^4$ and $R^5$ are as previously defined; $R^6$ is $C_{1-12}$ alkyl or $C_{1-12}$ aryl; and "e" ranges from 0 to about 1000. More preferably, $R^6$ is methyl and "e" ranges from about 1 to about 30.

The ethylenically unsaturated radical, $R^4$, is preferably allyl or vinyl. The radical $R^5$ is preferably a hydrolyzable or condensable group selected from the class consisting of halogens, hydroxy, $C_{1-10}$ alkoxy, amine, $C_{1-10}$ alkylamine, mercaptan, and $C_{1-10}$ alkylmercaptan.

Preferably, $R^5$ consists of a $C_{1-10}$ alkylamine. More preferably, $R^5$ is propylamine. Further, while the amine may be either primary, secondary, or tertiary, it is preferable that primary amines be used.

The process of producing a polymer alloy comprises the steps of:
1. reacting either component (A) or component (B) with the compatibliizer, component C; and
2. reacting the product of step 1 with the remaining component, either (A) or (B).

One practical way of choosing the reactants for step 1 would be to choose the one that is present in the least amount. In a composition that contains 100 parts of components (A) and (B), component (A) may be present in from about 1 to about 99 parts, component (B) may be present in from about 1 to about 99 parts, and component (C) will be present in an amount sufficient to compatibilize the reactant present in the least amount. The specific amounts will be determined by the desired final physical properties of the resultant polymer. Thus, for instance, if there are 70 parts of component (A) and 30 parts of component (B) there should be a sufficient amount of component (C) to compatibilize component (8) and make it reactive with component (A). On the other hand, if there are 30 parts of component (A) and 70 parts of component (B) there should be a sufficient amount of component (C) to compatibilize component (A) and make it reactive with component (B). Preferably there will be from about 0.5 to about 5 parts of component (C) per 100 parts of the lesser of components (A) and (B). The actual amounts will be dependent on the mole percent of the functional groups of the lesser of components (A) and (B) and the mole percent of the functional groups on component (C). The amounts should be determined such that there is an excess of component (C) in step 1 so that the compatibilization step is complete.

Another way of choosing the reactants for step 1 involves a consideration for the type of chemical reactions that are taking place. That is, it may be desirable, for whatever reason, to have the final cure step be a condensation reaction. Therefore, even if component (B) is less than component (A) it may still be desirable to compatibilize component (A) in step 1 so that step 2 involves a condensation reaction.

Still another method of compatibilizing one of the components would be to blend components (A) and (B) together. Component (C) would then be added to the mixture where it would react by condensation with component (B). When this step is complete a crosslinking catalyst, such as peroxide, is added to finally cure the composition.

The reaction between component (A) and the ethylenically unsaturated group of component (C), as stated previously, will typically be either a hydrosilation reaction or a free radical addition reaction. Such reactions may require a catalyst in order to initiate them. The hydrosilation reactions contemplated may be initiated by a platinum catalyst such as those taught by Lamoreaux in U.S. Pat. Nos. 3,917,432; 3,197,433; and 3,220,972; and by Karstedt in U.S. Pat. Nos. 3,715,334 and 3,814,730., and by Ashby et al. in U.S. Pat. No. 4,288,345; hereby incorporated by reference. The free radical reactions may be initiated by a peroxide as is taught by Noll, *Chemistry and Technology of Silicones*, Academic Press Inc., New York, NY, 1968, p. 231.

The condensation reaction between component (B) and the condensable group of component (C) may also require the presence of a condensation catalyst to initiate the reaction. Such catalysts include titanates; oxides of tin, zinc, etc.; acids; and bases, and are well known in the art.

In addition, in order to further improve the physical properties of the cured polymer it may be desirable to add reinforcing and extending fillers to the composition. Reinforcing fillers include fumed and precipitated silica as disclosed in Lucas, U.S. Pat. No. 2,938,009 and Beers, U.S. Pat. No. 3,837,878, hereby incorporated by reference. Extending fillers include titanium, iron oxide, aluminum oxide, diatomaceous earth, calcium carbonate, ground silica, quartz, diatomaceous silica, aluminum silicate, zinc oxide, chromium silicate, barium sulfate, zinc sulfide, aluminum silicate, and finely divided silica having surface bonded alkoxy groups, and mixtures thereof. Such fillers are taught by Christie, U.S. Pat. No. 3,865,778, hereby incorporated by reference. It may also be desirable to include small amounts of silanol fluid as a process aid in mixing the fillers. Such methods are known to those skilled in the art.

The following examples are provided in order to further illustrate this invention and should not be interpreted as limiting the scope of the invention.

In order to demonstrate the effect of a compatibilizer on a composition comprising a silicone gum having approximately 0.23 mole percent vinyl and an ethylene/acrylic elastomer the following samples were prepared as shown in Table I (amounts are in parts unless otherwise noted).

TABLE I

Formulations Demonstrating Effect of Compatibilizer on Composition

| Ingredient | Sample A | Sample B | Sample C |
|---|---|---|---|
| Silicone gum | 100.0 | 60.0 | 60.0 |
| Vamac * | 0.0 | 40.0 | 40.0 |
| VAC ** | 0.0 | 3 phr | 0.0 |
| Fumed silica | 40.0 | 40.0 | 40.0 |
| Diatomaceous earth | 20.0 | 0.0 | 0.0 |
| precipitated silica | 20.0 | 0.0 | 0.0 |
| Silanol fluid (process aid) | 5.0 | 4.0 | 4.0 |
| Cerium hydroxide masterbatch | 0.8 | 0.0 | 0.0 |

TABLE I-continued

Formulations Demonstrating Effect of Compatibilizer on Composition

| Ingredient | Sample A | B | C |
|---|---|---|---|
| Varox *** | 1.5 | 1.5 | 1.5 |

*tradename of an ethylene/acrylic elastomer sold by DuPont comprising reactive groups — —COOMe and —COOH
**Vinyl-Amine Compatibilizer — $H_2N$—$(CH_2)_3$—$(Me)_2Si$—O—$(Me)_2Si$—$CH$=$CH_2$ amounts based on Vamac amount
***peroxide catalyst composition containing 33% active peroxide sold by Kenrich Corp.

The samples were then prepared by reacting the VAC with the VAMAC and then reacting the resultant product with the siloxane. The cured product was then tested for physical properties with the results summarized in Table II.

TABLE II

Physical properties

| Test | Sample A | B | C |
|---|---|---|---|
| Tensile (psi) | 1090 | 1692 | 1243 |
| Elongation (%) | 338 | 467 | 799 |
| Modulus (100%, psi) | 379 | 251 | 100 |
| Hardness (Shore A) | 71 | 54 | 37 |
| Compression set (300° F., %) | 46 | 72 | 86 |

In order to demonstrate the effect of the amount of compatibilizer on the composition, three samples were prepared according to the formulations summarized in Table III (amounts are in parts unless otherwise noted).

TABLE III

Formulations Demonstrating Effect of Compatibilizer Level on Composition

| Ingredient | Sample D | E | F |
|---|---|---|---|
| Silicone gum | 60.0 | 60.0 | 60.0 |
| Vamac | 40.0 | 40.0 | 40.0 |
| VAC | 0.8 phr | 1.5 phr | 3.0 phr |
| Fumed silica | 60.0 | 60.0 | 60.0 |
| Silanol fluid | 5.0 | 4.0 | 4.0 |
| Varox | 1.5 | 1.5 | 1.5 |

The samples were then prepared by reacting the VAC with the VAMAC and then reacting the resultant product with the siloxane. The cured product was then tested for physical properties with the results summarized in Table IV.

TABLE IV

Physical properties

| Test | Sample D | E | F |
|---|---|---|---|
| Tensile (psi) | 1380 | 1491 | 1517 |
| Elongation (%) | 681 | 593 | 523 |
| Modulus (100%, psi) | 195 | 240 | 284 |
| Hardness (Shore A) | 57 | 62 | 64 |
| Tear (psi) | 325 | 285 | 215 |

What is claimed is:

1. An alloy composition comprising:
A. a silicone or organic polymer reactive with an unsaturated radical, the silicone or organic polymer having functional groups selected from the group consisting of vinyl, hydride, and epoxy groups; the silicone polymer being selected from the group consisting of silicone heat cured rubber, liquid injectable moldable silicon rubber, and fluorosilicone rubbers; and the organic polymer being selected from the group consisting of natural rubber, EPDM, nitrile rubber, chloroprene, SBR, butadiene rubber, isoprene, butyl rubber, and epoxy functional acrylates;
B. a silicone or organic polymer that is not reactive with an unsaturated radical, the silicone or organic polymer having condensable functional groups selected from the group consisting of hydroxy, alkoxy, carboxy, ester, amide, and halogen groups; the organic polymer being selected from the group consisting of epichlorohydrin, polyacrylates, polymethacrylates, chlorinated polyethylene, chlorosulfonated polyethylene, and halogenated butyl rubber; the silicone polymer being a silanol or an alkoxy terminated polysiloxane; and
C. a compatibilizer represented by the formula:

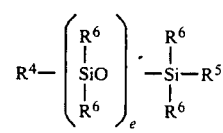

wherein $R^4$ is an ethylenically unsaturated radical; $R^5$ is a condensable functional group that is reactive with component (B) but is not reactive with component (A) and is selected from the class consisting of halogens, hydroxy, $C_{1-10}$ alkoxy, amine, $C_{1-10}$ alkylamine, mercaptan, and $C_{1-10}$ alkylmercaptan; $R^6$ is $C_{1-12}$ alkyl or $C_{1-12}$ aryl radical; "e" ranges from 0 to about 1000.

2. The alloy composition of claim 2 wherein component A is a vinyl functional silicone polymer.

3. The alloy composition of claim 1 wherein component B is an organic polymer having condensable functional groups comprising hydroxy or alkoxy functional groups.

4. The alloy composition of claim 1 wherein the ethylenically unsaturated functional group of component C is a vinyl radical.

5. The alloy composition of claim 1 wherein the alkylamine is propylamine.

6. A cured product of an alloy composition comprising:
A. a silicone or organic polymer reactive with an unsaturated radical, the silicone or organic polymer being functionalized with groups selected from the group consisting of vinyl, hydride, and epoxy groups; the silicone polymer being selected from the group consisting of silicone heat cured rubber, liquid injectable moldable silicone rubber, and fluorosilicone rubbers; and the organic polymer being selected from the group consisting of natural rubber, EPDM, nitrile rubber, chloroprene, SBR, butadiene rubber, isoprene, butyl rubber, and epoxy functional acrylates;
B. a silicone or organic polymer that is not reactive with an unsaturated radical, the silicone or organic polymer being functionalized with condensable functional groups selected from the group consisting of hydroxy, alkoxy, carboxy, ester, amide, and halogen gorups; the organic polymer being selected from the group consisting of epichlorohydrin, polyacrylates, polymethacrylates, chlorinated polyethylene, chlorosulfonated polyethylene, and halogenated butyl rubber; the silicone polymer being a silanol or an alkoxy terminated polysiloxane; and C. a compatibilizer represented by the formula:

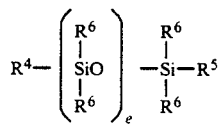

wherein $R^4$ is an ethylenically unsaturated radical; $R^5$ is a condensable functional group that is reactive with component (B) but is not reactive with component (A) and is selected from the class consisting of halogens, hydroxy, $C_{1-10}$ alkoxy, amine, $C_{1-10}$ alkylamine, mercaptan, and $C_{1-10}$ alkylmercaptan; $R^6$ is $C_{1-12}$ alkyl or $C_{1-12}$ aryl radical; "e" ranges from 0 to about 1000.

7. A process for producing a polymer alloy comprising the steps of:

A. reacting (1) a silicone or organic polymer having condensable functional groups, the organic polymer being selected from the group consisting of epichlorohydrin, polyacrylates, polymethacrylates, chlorinated polyethylene, chlorosulfonated polyethylene, and halogenated butyl rubber; the silicone polymer being a silanol or an alkoxy terminated polysilocane; and the condensable functional being selected from the group consisting of hydroxy, alkoxy, carboxy, ester, amide, and halogen groups; and (2) a compatibilizer represented by the formula:

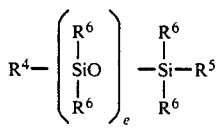

wherein $R^4$ is an ethylenically unsaturated radical; $R^5$ is a condensable functional group that is reactive with component (B) but is not reactive with component (A and is selected from the class consisting of halogens, hydroxy, $C_{1-10}$ alkoxy, amine, $C_{1-10}$ alkylamine, mercaptan, and $C_{1-10}$ alkylmercaptan; $R^6$ is $C_{1-12}$ alkyl or $C_{1-12}$ aryl radical "e" ranges from 0 to about 1000;

components (1) and (2) reacting to form a product having ethylenically unsaturated functional groups;

B. reacting the reaction product of step A with a silicone or organic polymer having functional groups that are reactive with the ethylenically unsaturated functional groups of the reaction product, the silicone or organic polymer being functionalized with groups selected from the group consisting of vinyl, hydride, and epoxy groups; the silicone polymer being selected from the group consisting of silicone heat cured rubber, liquid injectable moldable silicone rubber, and fluorosilicone rubbers; and the organic polymer being selected from the group consisting of natural rubber, EPDM, nitrile rubber, chloroprene, SBR, butadiene rubber, isoprene, butyl rubber, and epoxy functional acrylates.

* * * * *